United States Patent
Henry

(10) Patent No.: US 8,475,074 B1
(45) Date of Patent: *Jul. 2, 2013

(54) VARIABLE STIFFNESS JOINT MECHANISM

(75) Inventor: Christopher P Henry, Thousand Oaks, CA (US)

(73) Assignee: HRL Laboratories, LLC, Malibu, CA (US)

( * ) Notice: Subject to any disclaimer, the term of this patent is extended or adjusted under 35 U.S.C. 154(b) by 761 days.

This patent is subject to a terminal disclaimer.

(21) Appl. No.: 11/949,029

(22) Filed: Dec. 1, 2007

Related U.S. Application Data

(63) Continuation-in-part of application No. 11/713,560, filed on Mar. 1, 2007, now Pat. No. 7,678,440.

(60) Provisional application No. 60/778,245, filed on Mar. 1, 2006.

(51) Int. Cl.
*F16D 3/00* (2006.01)
*C22F 3/00* (2006.01)
*B28B 1/00* (2006.01)

(52) U.S. Cl.
USPC ............ 403/217; 52/81.1; 52/81.4; 52/655.1; 52/81.5; 403/170; 148/563; 428/327; 428/913; 428/304.4; 428/116; 257/415

(58) Field of Classification Search
USPC ... 464/92, 97; 901/15, 28–30, 36, 39; 623/63; 52/655.1–655.2, 80.1–81.6; 403/169–171, 403/176, 229, 180–182, 217–220; 135/122–125, 135/127, 141, 144; 273/155; 446/487; 267/174, 267/178; 428/116–119, 192, 327, 58, 913, 428/307.5; 257/415; 310/300; 264/177.12, 264/630; 148/563
See application file for complete search history.

(56) References Cited

U.S. PATENT DOCUMENTS

| | | | |
|---|---|---|---|
| 2,954,622 A | | 10/1960 | Moore |
| 3,864,049 A | * | 2/1975 | Ono ............................ 403/171 |
| 4,061,812 A | | 12/1977 | Gilwee, Jr. et al. |
| 4,905,443 A | * | 3/1990 | Sutcliffe et al. .............. 52/655.2 |
| 5,318,470 A | * | 6/1994 | Denny .......................... 446/126 |
| 5,395,390 A | | 3/1995 | Simon et al. |
| 5,733,015 A | * | 3/1998 | Demarest et al. .......... 301/5.307 |
| 6,000,660 A | | 12/1999 | Griffin et al. |
| 6,106,548 A | | 8/2000 | Roubin et al. |
| 6,175,170 B1 | | 1/2001 | Kota et al. |
| 6,176,502 B1 | * | 1/2001 | Blondelet et al. ...... 280/124.128 |
| 6,182,929 B1 | | 2/2001 | Martin et al. |
| 6,244,638 B1 | | 6/2001 | Kuczynski et al. |

(Continued)

FOREIGN PATENT DOCUMENTS

WO    WO/03/018853    6/2003

OTHER PUBLICATIONS

FlexSys Inc.; Shape Morphing; Sep. 2007 web page; located at: http://www.flxsys.com/applications/shape%20Morphing.

(Continued)

*Primary Examiner* — Jeanette E. Chapman
(74) *Attorney, Agent, or Firm* — Christopher R. Balzan

(57) ABSTRACT

In some embodiments, a variable stiffness joint is provided which has a plurality of structural members with a variable stiffness material coupled between the plurality of structural members. The variable stiffness material may be selectively activated/inactivated to control the stiffness of the joint. Additional embodiments and implementations are disclosed.

29 Claims, 8 Drawing Sheets

U.S. PATENT DOCUMENTS

| | | | |
|---|---|---|---|
| 6,265,333 B1 | 7/2001 | Dzenis et al. | |
| 6,301,742 B1 | 10/2001 | Kota | |
| 6,447,478 B1 | 9/2002 | Maynard | |
| 6,588,967 B2 * | 7/2003 | Rivin | 403/130 |
| 6,664,702 B2 | 12/2003 | Soroushian | |
| 6,764,520 B2 | 7/2004 | Deffenbaugh et al. | |
| 6,869,246 B2 * | 3/2005 | Bridgers | 403/229 |
| 6,969,548 B1 | 11/2005 | Goldfine | |
| 7,250,839 B2 | 7/2007 | Racz et al. | |
| 7,550,189 B1 * | 6/2009 | McKnight et al. | 428/116 |
| 7,678,440 B1 * | 3/2010 | McKnight et al. | 428/116 |
| 8,267,967 B2 * | 9/2012 | McDonnell | 606/254 |
| 2003/0102411 A1 | 6/2003 | Kota | |
| 2003/0175069 A1 | 9/2003 | Bosscher et al. | |
| 2003/0234598 A1 | 12/2003 | Fuller et al. | |
| 2003/0235460 A1 | 12/2003 | Moon et al. | |
| 2004/0197519 A1 | 10/2004 | Elzey et al. | |
| 2005/0049690 A1 | 3/2005 | Boismier et al. | |
| 2005/0287371 A1 | 12/2005 | Chaudhari et al. | |
| 2006/0194635 A1 * | 8/2006 | Cunningham et al. | 464/86 |
| 2006/0202492 A1 | 9/2006 | Barvosa-Carter et al. | |
| 2007/0005110 A1 * | 1/2007 | Collier et al. | 606/228 |
| 2009/0047197 A1 | 2/2009 | Browne et al. | |

OTHER PUBLICATIONS

Yalcintas, and Dai, Magnetorheological and electrorheological materials in adaptive structures and their performance comparison, Smart Mater.Struct. 8 (1999), pp. 560-573.

Yalcintas, and Coulter, Electrorheological material based non-homogeneous adaptive beams, Smart Mater. Struct. 7 (1998), pp. 128-143.

Abrahamson, Lake, Munshi, and Gall, Shape Memory Polymers for Elastic Memory Composites, 43rd Structures, Structural Dynamics, and Materials Conference, Apr. 22-25, 2002, Denver, Colorado, AIAA 2002-1562; pp. 1-11.

Cadogan, Scarborough, Lin, and Sapna, Shape Memory Composite Development for Use in Gossamer Space Inflatable Structures, 43rd AIAA/ASME/ASCE/AHS/ASC Structures, Structural Dynamics, and Materials Conference & Exhibit, Apr. 22-25, 2002, Denver, Colorado, 2002-1372; pp. 1-11.

Francis, Lake, Mallick, Freebury, Maji, Development and Testing of a Hinge/Actuator Inforporating Elastic Memory Composites, 44th Structures, Structural Dynamics, and Materials Conference, Apr. 7-10, 2003, Norfolk, Virginia AIAA 2003-1496; pp. 1-14.

Lake, and Beavers, The Fundamentals of Designing Deployable Structures with Elastic Memory Composites, 43rd Structures, Structural Dynamics, and Materials Conference, Apr. 22-25, 2002, Denver Colorado, AIAA 2002-1454; pp. 1-13.

Lake, Munshi, Tupper, Meink, Application of Elastic Memory Composite Materials to Deployable Space Structures, AIAA Space 2001 Conference and Exposition, Aug. 28-30, 2001, New Mexico, AIAA 2001-4602; pp. 1-10.

Liang, Rogers, Malafeew, Investigation of Shape Memory Polymers and Their Hybrid Composites, Journal of Intelligent Material Systems and Structures, vol. 8—Apr. 1997, pp. 380-386.

Campbell and Maji, Deployment Precision and Mechanics of Elastic Memory Composites, 44th Structures, Structural Dynamics, and Materials Conference, Apr. 7-10, 2003, Norfolk, Virginia AIAA 2003-1495, pp. 1-9.

USPTO Office Action dated Aug. 11, 2008 for U.S. Appl. No. 11/713,560, by McKnight et al., issued as US7,678,440.

USPTO Office Action dated Mar. 5, 2009 for U.S. Appl. No. 11/713,560, by McKnight et al., issued as US7,678,440.

PTO Office Action dated Jan. 9, 2008 for U.S. Appl. No. 11/193,148, patent No. 7,550,189, by McKnight et al.

PTO Final Office Action dated Oct. 30, 2008 for U.S. Appl. No. 11/193,148, patent No. 7,550,189, by McKnight et al.

McKnight, et al., U.S. Appl. No. 11/347,505, filed Feb. 3, 2006.

PTO Office Action dated Mar. 31, 2010 for U.S. Appl. No. 12/467,693.

* cited by examiner

VARIABLE STIFFNESS JOINT MECHANISM

CROSS REFERENCE TO RELATED APPLICATIONS

This application is a continuation in part of U.S. application Ser. No. 11/713,560, filed Mar. 1, 2007, now U.S. Pat. No. 7,678,440 by McKnight et al. entitled DEFORMABLE VARIABLE-STIFFNESS CELLULAR STRUCTURES, which is a continuation in part application that claims the benefit of priority of U.S. Provisional Application No. 60/778,245, filed Mar. 1, 2006 entitled DEFORMABLE VARIABLE-STIFFNESS CELLULAR STRUCTURES.

BACKGROUND

The topology and spatial connectivity of a structure determine how loads and displacements are transmitted from their source to reaction locations. Some structures where topology and connectivity are especially important are in a variety of truss structures, 2D and 3D cellular structures, compliant mechanisms, composites, and the like. The locations where two or more structural/mechanism members join are joints or structural nodes. In the structure of some mechanisms, it is sometimes advantageous to control the extent of engagement between certain members, such as along the load path between the source and reaction.

As such, the present inventor has discovered that what is needed is a means to selectively control which members of a structural node are permitted to become kinematically free in rotation, and/or which members of a structural node can transmit loads. Moreover, the present inventor has discovered what is needed is customized levels of mechanical resistance, or "load tailoring" within a structure. Further, the present inventor has discovered what is needed is a joint that allows the angle of members coming out of the spherical joint to be varied and then fixed or locked into place.

SUMMARY

In some embodiments, a variable stiffness joint is provided which has a plurality of structural members with a variable stiffness material coupled between the plurality of structural members. The variable stiffness material may be selectively activated/inactivated to control the stiffness of the joint. Additional embodiments and implementations are disclosed.

BRIEF DESCRIPTION OF THE DRAWINGS

The features and advantages of the present invention will be better understood with regard to the following description, appended claims, and accompanying drawings where:

DESCRIPTION

This application is related to U.S. patent application Ser. Nos. 11/347,505, by McKnight et al., filed Feb. 3, 2006, entitled ACTUATION CONCEPTS FOR VARIABLE STIFFNESS MATERIALS, and 11/713,560, by McKnight et al., entitled DEFORMABLE VARIABLE STIFFNESS VARIABLE CELLULAR STRUCTURES, filed Mar. 1, 2007, both herein incorporated by reference in their entireties.

Figure 1A:
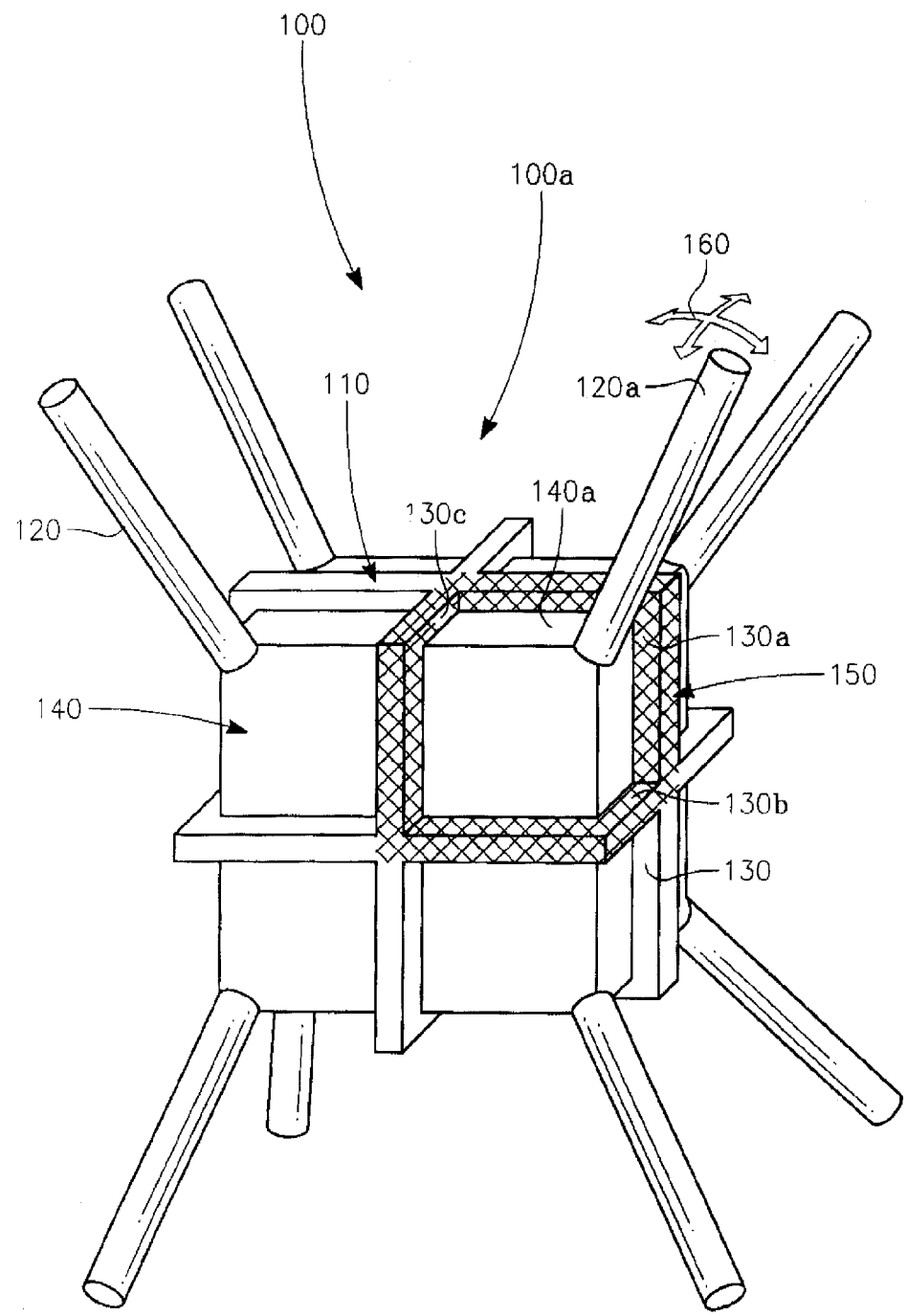
FIGS. 1A and 1B are perspective views of a possible embodiment of a variable stiffness spherical joint.
Figure 1B:
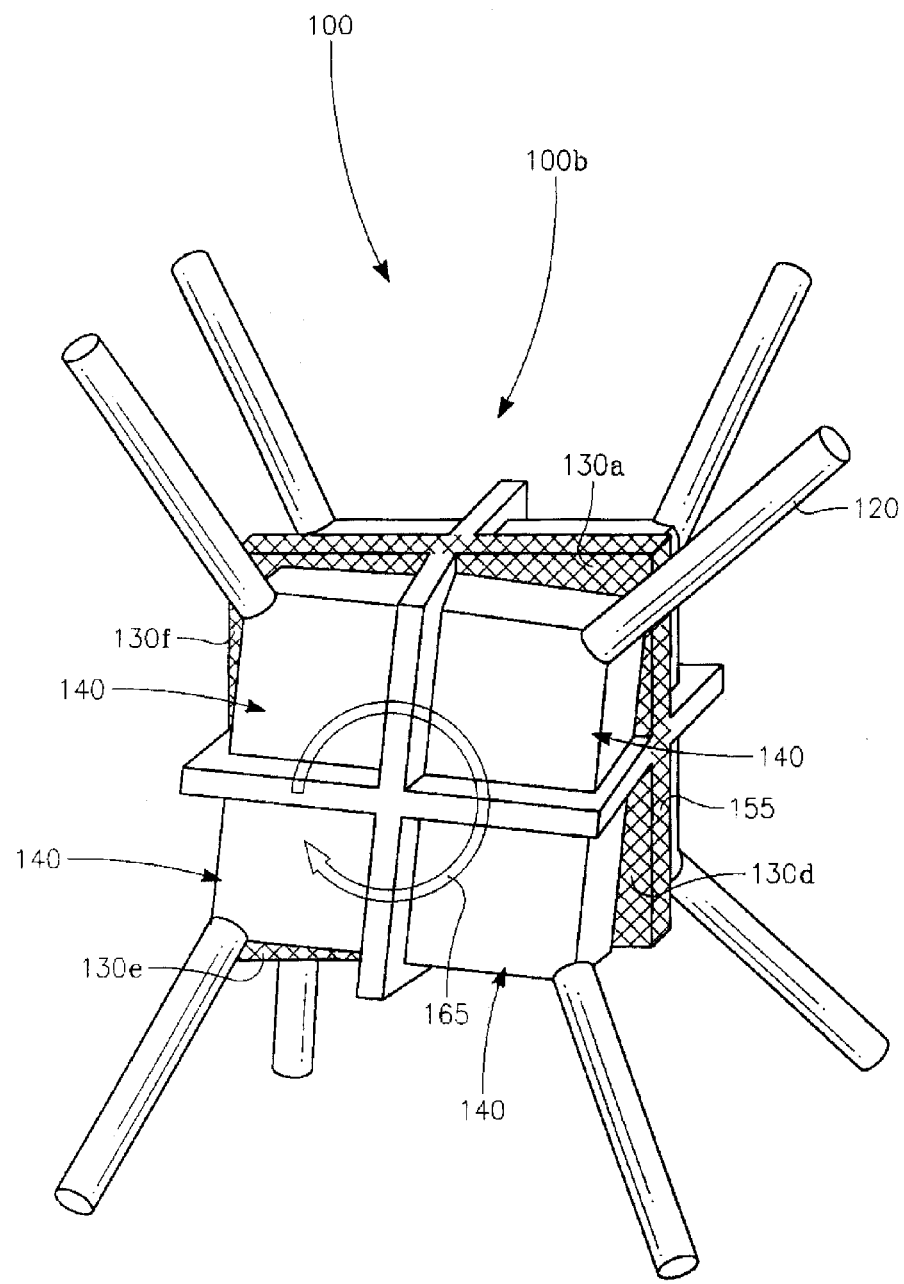

FIGS. 1A and 1B are perspective views showing illustrations of a variable stiffness spherical joint 100 in accordance with a possible embodiment. In this example embodiment, the joint 100 is divided into 8 structural connector octants 150 to which a structural member 120 connection may be made. Other amounts of connection points are possible. In this embodiment, there are 3 intersecting orthogonal planes of variable stiffness material 110. Sections 130 of variable stiffness material 110 are positioned between each of the connectors 140. Combinations of sections 130 may be selectively softened or rigidized. Shown in FIG. 1A, an individual connector octant 150 can be selectively rigidized or soften to allow selective movement of a one or more structural member 120.

When these specific sections 130 of the variable stiffness material change stiffness (to a soft state) the desired kinematic degree of freedom is expressed. Otherwise, when the variable stiffness material is rigid, the degree of freedom cannot be expressed and joint is static and can transmit load along the degree of freedom. For a spherical joint 100 with many structural members 120, the variable stiffness material between these structural members 120 could selectively permit kinematic degrees of freedom in desired directions, while maintaining static joint connections in other selective directions.

FIG. 1A illustrates activation of 3 co-adjacent sections 130a, 130b, and 130c of variable stiffness material to free a single strut 120 with 3 rotational degrees of freedom, in the x, y and z directions as illustrated by arrow 160. FIG. 1B illustrates 1 planar portion 135 of variable stiffness material separating multiple connectors 140 of the spherical joint 100b, to free half of the spherical joint 100b with 1 rotational degree of freedom. With the embodiment of FIGS. 1A and 1B, it is possible to selectively choose which structural members 120 of the joint 100 are flexible.

As shown in FIG. 1A, three contiguous adjacent orthogonal sections 130a, 130b, and 130c can be softened to isolate an individual connector 140a to provide 3 degrees of freedom for the structural member 120a. Or, as shown in FIG. 1B, with the same design, four contiguous sections 130a, 130d, 130e, and 130f in a single plane 155 may be softened to isolate two halves (or hemispheres) of the spherical joint 100b from each other with one degree of freedom, i.e. rotational. In the illustration shown in FIG. 1B, the activated plane 155 allows rotation movement of half of the structural members 120 of the spherical joint 100b, as indicated by arrow 165. Thus, the relative motion of the structural members between hemispheres may be freed, while the joints are fixed within the hemispheres.

The sections 130 may be selectively activated. For example, in one embodiment, the variable stiffness material may be a heat sensitive shape memory polymer. In such an embodiment, heaters may be embedded in, adjacent to, or on the surface of the variable stiffness material. Or, a structural member 120 or its connector 140 could be heated. Separate control (illustrated in FIG. 4) may be employed to activate the individual sections 130 of variable stiffness material.

The structural members 120 may include connectors 140 which are a different geometry than the structural members 120, or they may be same geometry and size. The structural members 120 may be connected directly to the variable stiffness material 130, or the variable stiffness material 130 may have a geometry similar to the connector 140 which surrounds or partially surrounds the end or a portion of the structural members 120. For example, the variable stiffness material may be cubic, spherical, etc., or sections thereof, in which the structural member is embedded. As used herein, a "structural member" of the variable stiffness joint may be simply a connector, to which a truss or another structural member is connected, joined, inserted, bonded, secured, fixed, etc.

In some embodiments, the connectors 140 are not structural, but rather are formed in whole or in part of variable stiffness material. In such embodiments, the structural members 120 may extend and mechanically connect to each other (not shown) within the joint 100. Thus, the variable stiffness material may partially or completely surround the structural members 120 and/or the linkage (not shown) within the joint 100.

Figure 2:
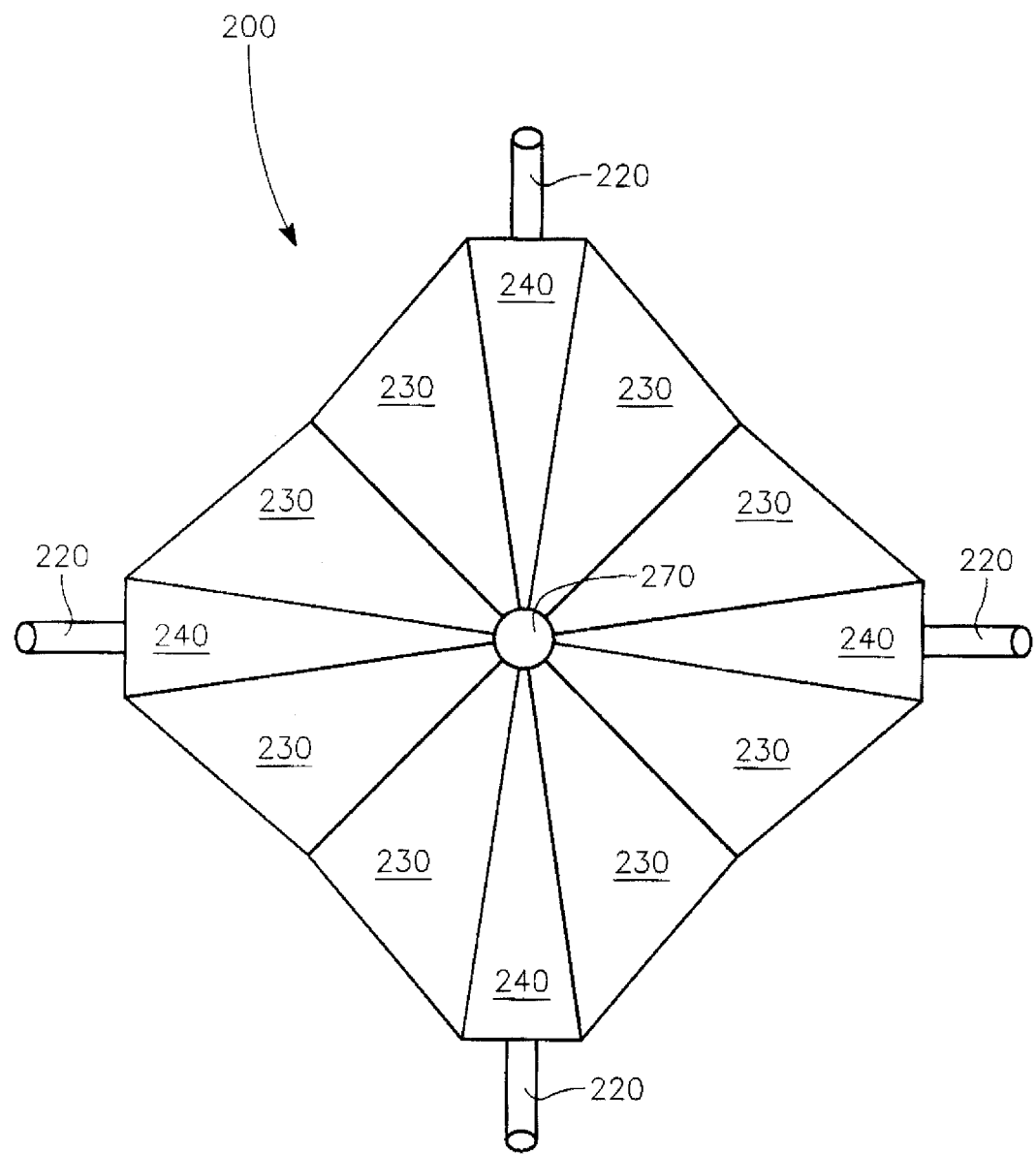
FIG. 2 shows an illustration of a top view of a possible embodiment of a variable stiffness spherical joint.

FIG. 2 shows a top view of a possible embodiment of a spherical joint 200 with variable stiffness material sections 230 between structural connections 240. The variable stiffness material allows selectively controllable softening and stiffening to permit or restrict movement of the structural members 220. The structural connectors 240 provide a larger surface area to secure the sections 230 therewith. In various embodiments, the structural connectors 240 may be integral with, or detachable from, the structural members 220.

In this embodiment, the variable stiffness material sections 230 form an umbrella like webbing between the structural connectors 240. In some embodiments, the sections 230 may be segmented, or be continuous material, capable of being stretched, folded, accordioned, or the like. The variable stiffness material may form the entire material of the sections 230, select portions of the sections 230, or only the connection between the sections 230 and/or structural connectors 240 to allow deflection of the sections 230.

In other embodiments (not shown), the sections 230 form a continuous web, not separated by the structural connectors 240. In other embodiments, the variable stiffness material may be associated with connecting linkages connecting the structural members 220 to restrain the movement of the connecting linkages, connectors 240, and/or structural members 220.

In one embodiment (not shown), a mechanical interconnection, such as a helical spring or other flexure member could be coated with a variable stiffness material to control the action of such a linkage.

The sections 230, or portions of the sections 230, may be selectively activated/inactivated, such as by heating/cooling in the case of a shape memory polymer.

In some embodiments, all or a portion of the hole 270 in the middle of the spherical joint 200 may be filled with variable stiffness material to create a direct connection between non-adjacent structural members 240. This would make it possible to fix non-adjacent structural members 240 to one another, to allow transfer of loads between non-adjacent members 240.

Figure 3:
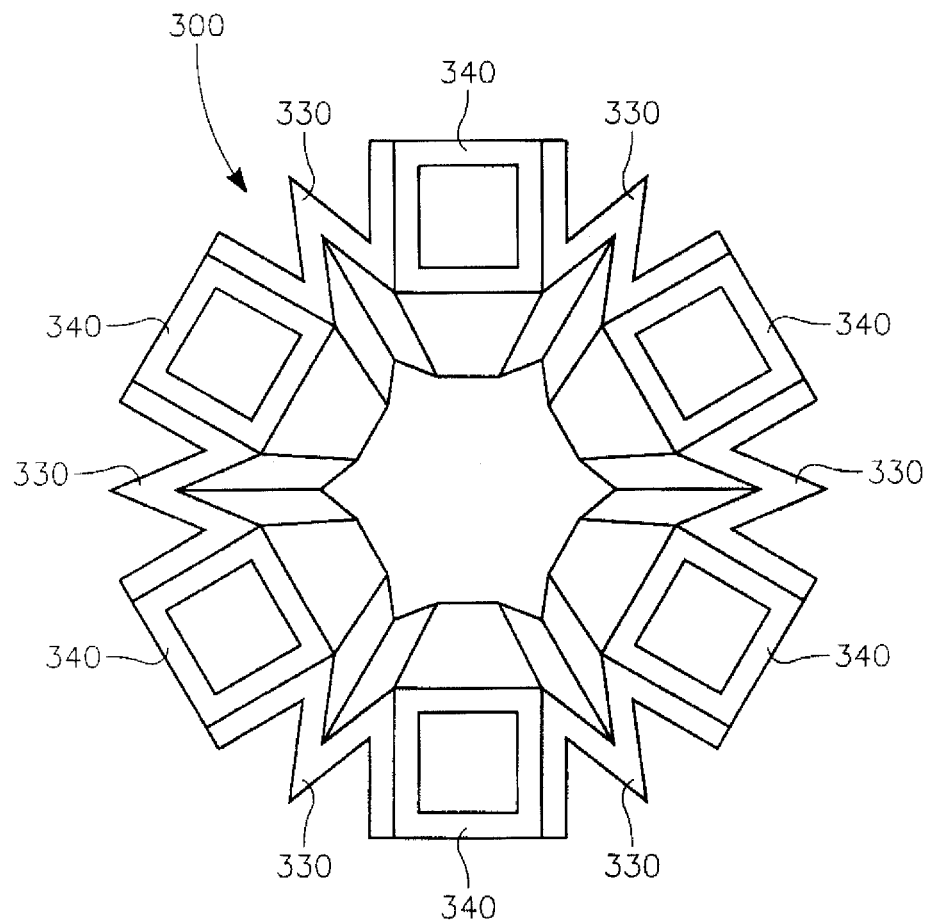
FIG. 3 shows a perspective view of a variable stiffness spherical joint in accordance with a possible embodiment.

FIG. 3 shows a perspective view a spherical joint 300 in accordance with a possible embodiment. In this embodiment, variable stiffness material interconnects 330 compose an accordion-like variable stiffness material between the structural connectors 340 to provide a wide magnitude of motion within a degree of freedom.

Figure 4:
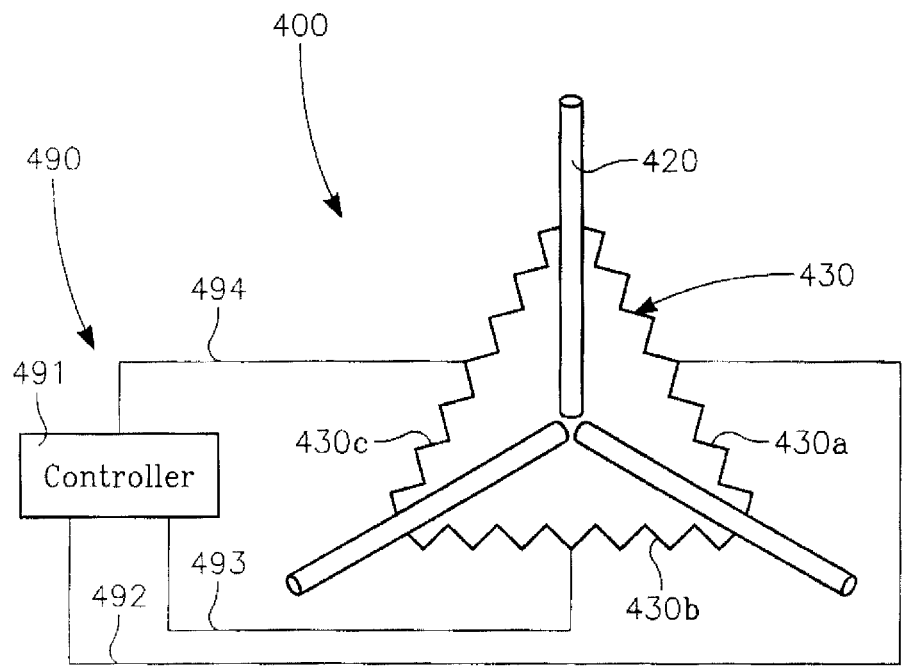
FIG. 4 is a simplified schematic illustration of a planar joint.
Figure 5:
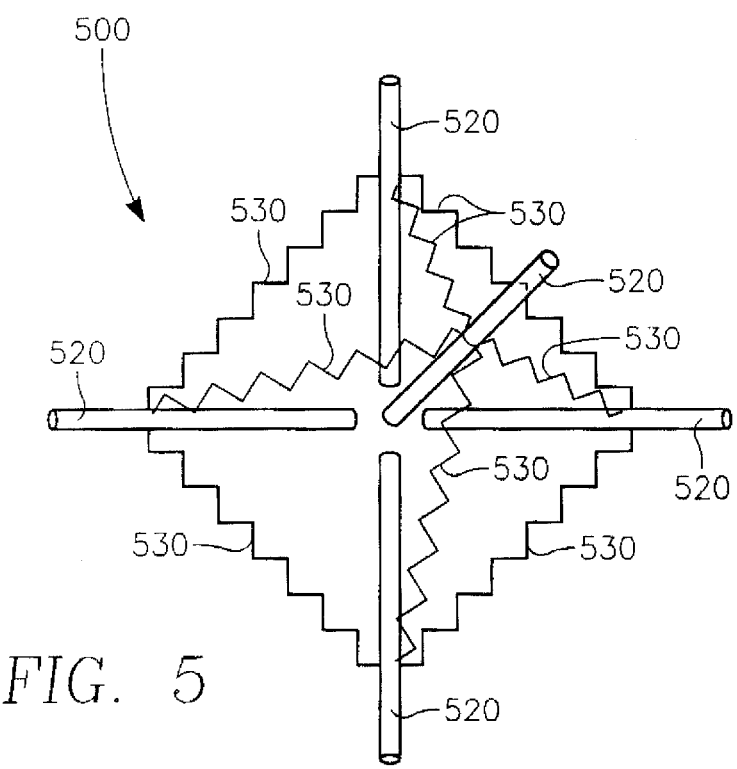
FIG. 5 show simplified schematic illustration of a spherical joint.

The above embodiments are not limited to the number of structural members illustrated. FIGS. 4 and 5 show simplified schematic illustrations of spherical joints 400 and 500, respectively. In FIG. 4, shows three structural members 420 connected by variable stiffness material 430, which may be sections or any other configuration. FIG. 5 shows five structural members 520 connected by variable stiffness material 530. Many other combinations and geometries are possible.

FIG. 4 also illustrates a simplified control system 490, which is possible in some embodiments. Shown in FIG. 4, is a controller 491 connected via control lines 492, 493, and 494 to activators/inactivators (not shown), corresponding with the variable stiffness material portions 430a, 430b, and 430c, respectively. The controller 491 may supply power to heaters (not shown), for example, via control lines 492, 493, and/or 494 to modify the stiffness of a variable stiffness material 430 composed of shape memory polymer. The controller 491, control lines 492-494, and activators/inactivators (not shown) provides a means to control the activation/inactivation of the variable stiffness material 430. Other means are possible and will depend on the type of variable stiffness material. For example, the variable stiffness material may include materials which may be activated/inactivated thermally, electrically, magnetically, chemically, and/or electromagnetically, so the means to control variable stiffness material 430 depends on the particular activation/inactivation characteristic of variable stiffness material 430 utilized. Known control mechanisms associated with a corresponding type of variable stiffness material 430 may be configured and utilized with the spherical joint 400.

In some embodiments, the entire spherical joint 400 may be place within a field, such as a thermal field to act upon the entire spherical joint 400, for example to heat/cool the entire spherical joint 400, instead of separate activators/inactivators for each portion 430a, 430b, and 430c. Some methods to enable a thermal field are: fluid or air flow, resistively or inductively heated material, etc.

Figure 6A:
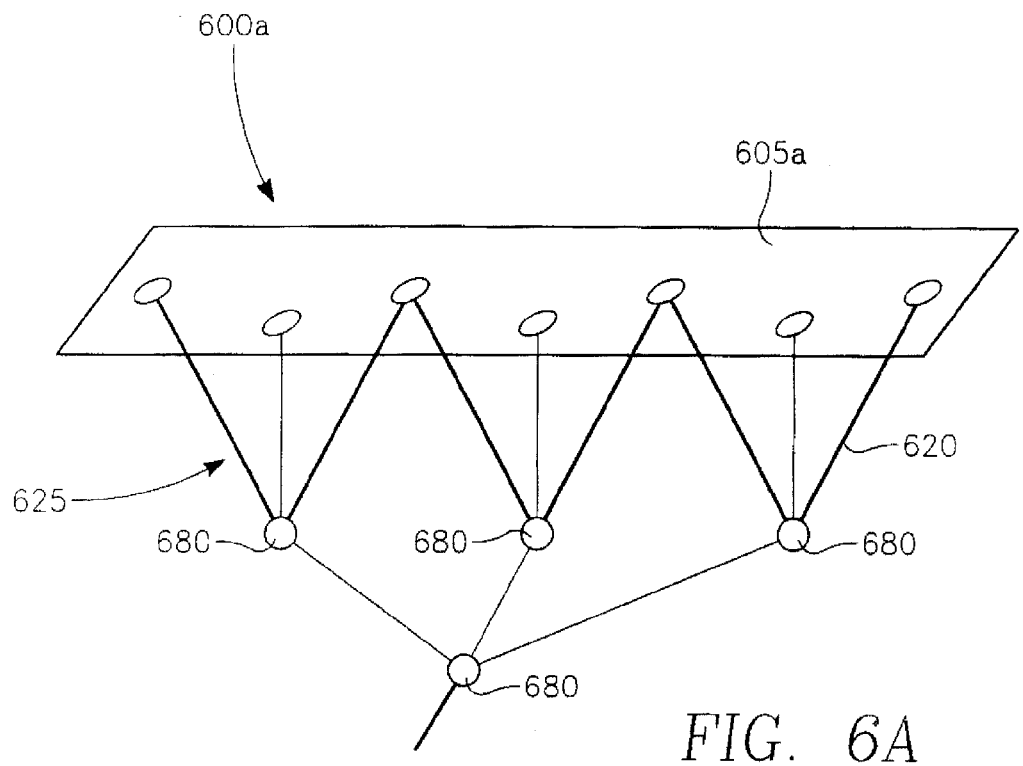
FIGS. 6A and 6B show a schematic representation of a structural surface with an attached truss structure formed with variable stiffness spherical joints.
Figure 6B:
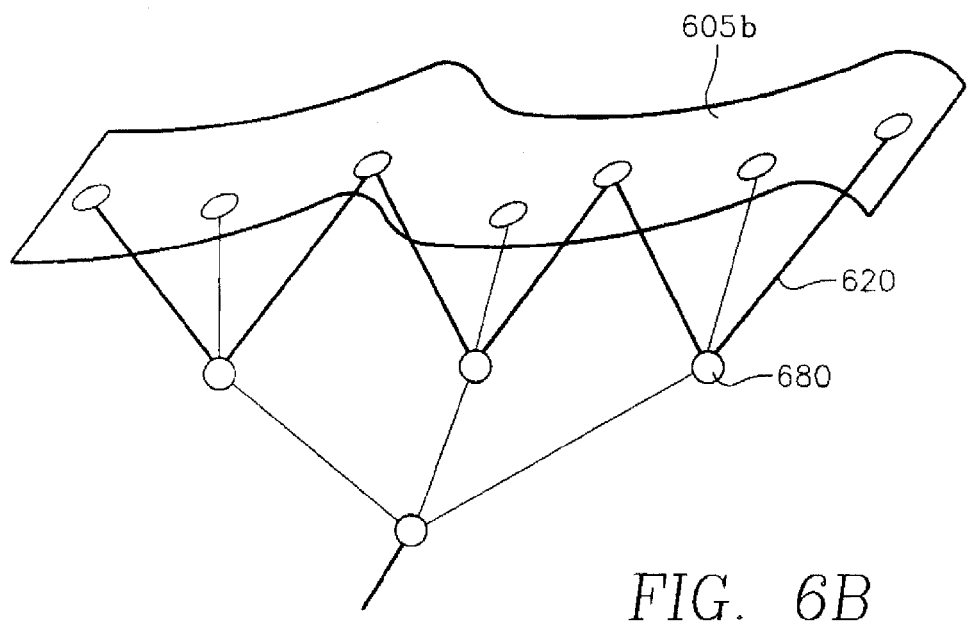

FIGS. 6A and 6B show a schematic representation of one of many possible applications of variable stiffness spherical joints 680. FIGS. 6A and 6B show a schematic representation of a structural surface 605, which may be rigid or flexible, with an attached truss structure 625 formed with variable stiffness spherical joints 680. FIG. 6A shows schematically the positions of the variable stiffness spherical joints 680, which when portions of the variable stiffness joint are selectively softened as shown in FIG. 6B, structural members 620 extending from the variable stiffness joint 680 have additional rotational degrees of freedom to change the contour of the structural surface 605b.

Figure 7:
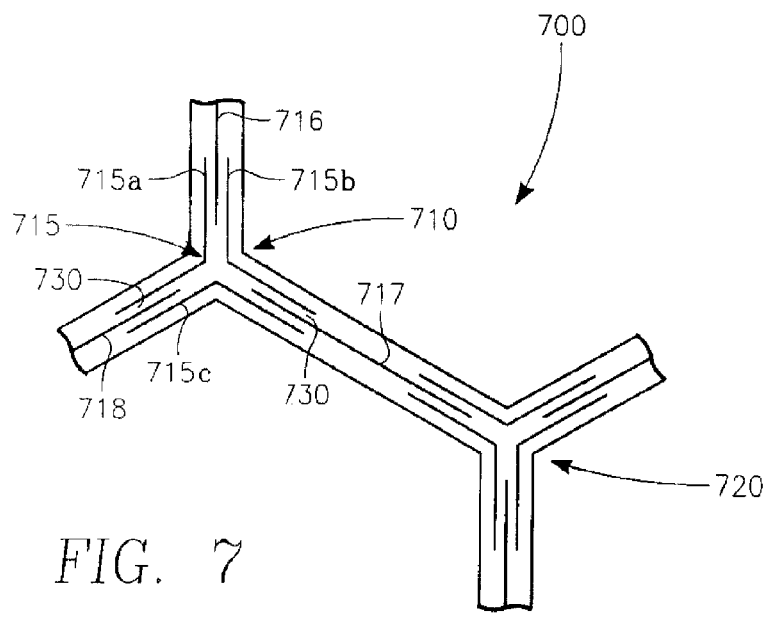
FIG. 7 shows a top view of an embodiment of variable stiffness joints as part of a truss structure.

FIG. 7 shows a top view of an embodiment of variable stiffness joints 710 and 720 as part of a truss structure 700. The variable stiffness joint 710 has a central guide portion 715 forming a structural intersection, which allows translation and/or rotation of the variable stiffness joint 710, depending on the embodiment. In the embodiment of FIG. 7, the central guide 715 has three outer guide portions 715a, 715b, and 715c. Extending between the outer guide portions 715a, 715b, and 715c are structural members 716, 717, and 718. Structural member 716 extends between guide portions 715a and 715b. Structural member 717 extends between guide portions 715b and 715c. Structural member 718 extends between guide portions 715c and 715a. In this embodiment, a unitary guide 715a for example, spans adjacent to two different structural members 716 and 718. Separating the outer guide portions 715a, 715b, and 715c from the structural members 716, 717, and 718 is a variable stiffness material 730.

In this embodiment, it is possible to locate the variable stiffness material 730 not only between the outer guide portions 715a, 715b, and 715c and the structural members 716, 717, and 718, but also extending along the length of the structural members 716, 717, and 718. Further, variable stiffness material 730 may be located along the exterior of the guide portions 715a, 715b, and 715c. This can provide additional support for the joint 710.

It is not necessary in all embodiments, to have the joints 710 and 720 connected by a unitary structural member 717, or that the joint 710 be connected to another joint 720 as shown. The joint 710 may be used alone, or connected other joints 720 as needed.

Figure 8:
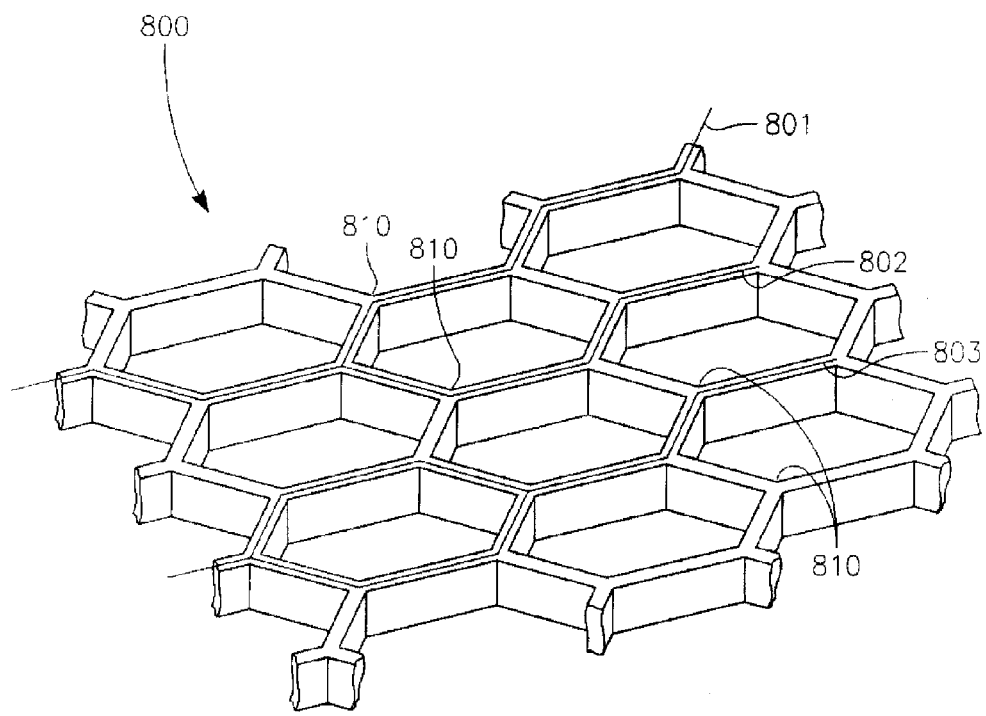
FIG. 8 shows a perspective view illustrating a planar truss structure with variable stiffness joints to control the load paths.

FIG. 8 shows a perspective view illustrating a planar truss structure 800 that demonstrates the use of variable stiffness joints 810 to control the load paths 801, 802, and 803, for example, through a planar truss structure 800. The variable stiffness joints 810 allow the planar truss structure 800 to achieve a desired planar deformation.

Figure 9:
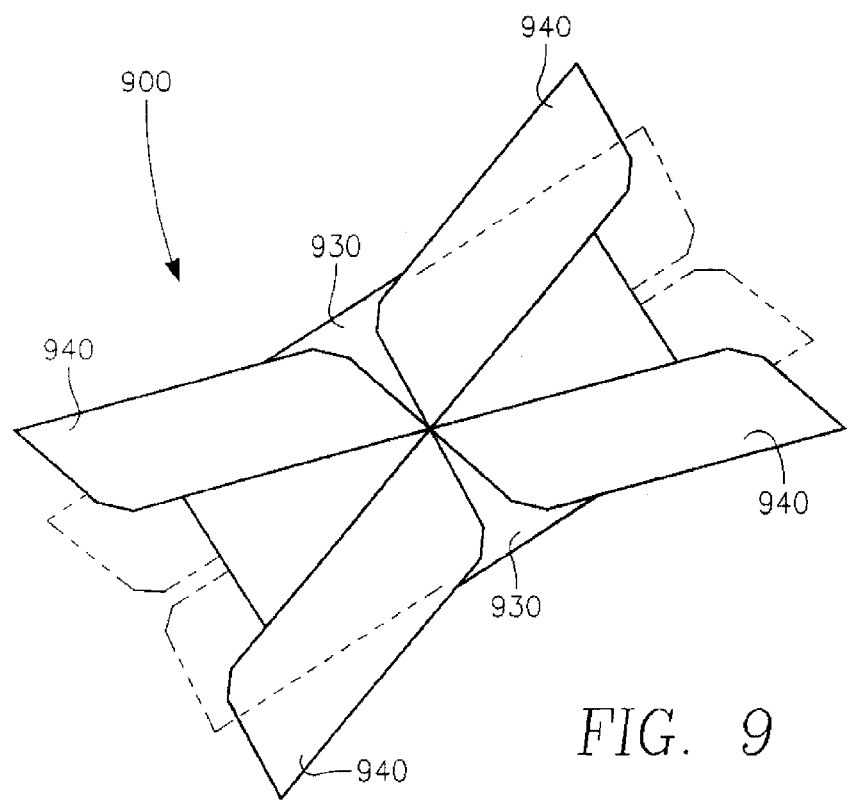
FIG. 9 shows a top view of a variable stiffness joint.

FIG. 9 shows a top view of a variable stiffness joint 900. In this embodiment, the variable stiffness material 930 is webbed between the structural members 940. As shown, the structural members 940 are formed in a planar configuration. The planar structural members 940 may be rotated into a compressed configuration as illustrated by phantom line. The variable stiffness material 930 may be separate webbed pieces between the planar structural members 940 (as shown) or the variable stiffenss material 930 may be layered or laminated (not shown) with the planar structural members 940.

Figure 10:
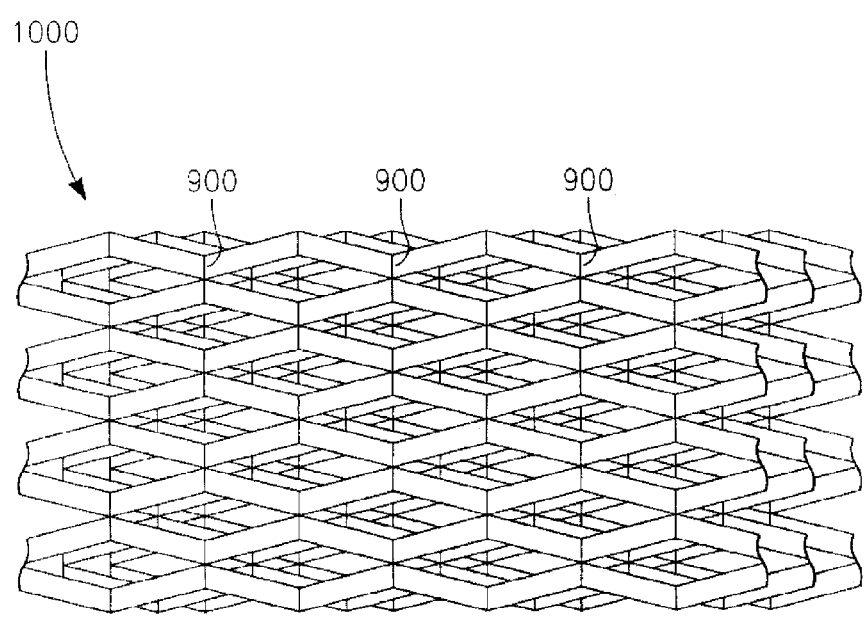
FIG. 10 shows a cut away side view of a truss structure of the variable stiffness joints.

FIG. 10 shows a cut away side view of a truss structure 1000 of the variable stiffness joints 900 of FIG. 9. The variable stiffness joints 900 are connected in a planar repeating pattern and stacked in a staggered fashion in a lattice like configuration. In this configuration, the truss structure 1000 can reposition and/or support compressive loads applied the top and bottom of the truss structure 1000, loads acting lateral to the planar structure variable stiffness joints 900 which cause/allow repositioning positioning of the planar structures 940 (shown in FIG. 9). The variable stiffness material, not shown in FIG. 10, may be laminated between layers of connected variable stiffness joints 900

As with the above embodiments, the variable stiffness material 930 (shown in FIG. 9) may be softened and/or stiffened to reposition and/or restrict, dampen, or inhibit motion of the structural members 940, depending on the application. For example, as is evident from the above discussion, the variable stiffness material 930 (shown in FIG. 9) can be softened, the truss structure 1000 repositioned, such as by bending, and then stiffened to maintain the deformation of the truss structure matrix 1000. Many other applications are possible.

Embodiments of the variable stiffness spherical joint may permit virtual mechanical mechanisms without determining the topology a priori, or allow changing the topology during operation. Some embodiments can allow another design variable, tailored stiffness and joint connectivity.

Depending on the configuration of the variable stiffness spherical joint and of the variable stiffness elements, 1, 2, or 3 degrees of freedom may be freed for individual structural members that converge at a joint. Various embodiments allow the number of intersecting structural members to be greater than two, the number and location of structural member node connections that are selectively controllable to be greater than 1, and the number of rotational degrees of freedom that are selectable to be 1, 2, or 3. In some embodiments, the variable stiffness material may allow controllable restraint of the structural members, either by completely or partially releasing and securing the structural members, providing complete, partial, or substantially no resistance to motion, depending on the embodiment.

In various embodiments, the placement of variable stiffness materials, for example shape memory polymers or their composites, within or between structural members at a node in a truss structure allows selective control of members of a structural node. As such, in some embodiments, it is possible to select which members are permitted to undergo large angular displacements (because of a mechanically underspecified/underconstrained linkage), and which members of a structural node are permitted to transmit loads. This can allow for customized levels of mechanical resistance, or "load tailoring" within a structure.

Depending on the embodiment, the range and ease of motion of the structural members will be limited by the deformability of the variable stiffness material. For example, this will occur where the variable stiffness material directly connects the structural members. Thus, while allowing motion, the variable stiffness material can also restrict the range of motion, as well as control the ease with which the structural members may be moved. The range of motion can also be restricted by the addition of hard stops attached to the structural members and/or structural connectors. In other embodiments, the range of motion may be limited by mechanical linkages or interconnections, for example where the variable stiffness material couples/controls coupling of the structural members along with a mechanical linkage or other mechanical interconnection.

The variable stiffness material may directly or indirectly couple the structural members together. The variable stiffness material may control the coupling between structural members if it directly or indirectly couples the structural members together, or if it inhibits a mechanical linkage which couples the structural members.

Various embodiments, potentially provide the advantages of a controllable mechanical load switch at the joints and nodes of a truss-like structure. This could permit increases or decreases of deformation, switching of mechanical components into the load path, transferring strain energy to a different portion of the structure, preventing damage to or isolate a portion of a structure, reducing vibrations, creating hinges, moving structural portions for stowing and deploying, and affecting performance sensitive geometries such as reflectors and aerofoil surfaces. The structural members, connectors, and guides may be rigid, semi rigid, or even compliant in various embodiments.

Various embodiments could be used in applications such as morphing aircraft wings or other structures, reconfigurable reflectors for space or other applications, tunable damping and crash structures for automobiles or other vehicles or crafts, and/or deployable structures. Many other applications and uses are possible.

Although the term spherical joint is used herein, each of the structural members may have 1, 2, or 3 degrees of freedom. As such, the degrees of freedom of the joint may be termed planar, conical, and spherical, respectively.

Selectively active variable stiffness materials may include materials controlled thermally, electrically, magnetically, chemically, and/or electromagnetically. Non-limiting examples of thermally controlled materials include shape memory polymers and shape memory alloys. A related class of thermal materials which change stiffness in association with a change in the phase of the material include solid-liquid phase change materials. Non-limiting examples of this type of phase change materials include metals and metal alloys, polymers, wax, water, etc. Non-limiting examples of materials which undergo a change in stiffness associated with the application of an electrical field include ferroelectric materials, electrostrictive polymers, liquid crystal elastomers, and electrorheological fluids. Non-limiting examples of materials which undergo a change in stiffness associated with the application of a magnetic field include magnetostrictive materials, ferromagnetic shape memory alloys, and magnetorheological materials. Variable stiffness materials such as baroplastics, solvable polymers, reversible adhesive polymers or structures may be utilized. Such materials, as well as other known materials, can provide a variable stiffness coupling means, which allow the stiffness of a connection to be changed, softened or stiffened, and then returned to, or close to, its original stiffness.

The example embodiments herein are not intended to be limiting, various configurations and combinations of features are possible. Having described this invention in connection with a number of embodiments, modification will now certainly suggest itself to those skilled in the art. As such, the invention is not limited to the disclosed embodiments, except as required by the appended claims.

What is claimed is:

1. A variable stiffness joint comprising:
   a) a spherical joint comprising:
      (1) a plurality of structural members; and
      (2) a variable stiffness material coupling the plurality of structural members, wherein the variable stiffness material is interposed between adjacent surfaces of the plurality of structural members.

2. The variable stiffness joint of claim 1, wherein each of the plurality of structural members comprise a connector, the variable stiffness material coupling adjacent connectors.

3. The variable stiffness joint of claim 2, wherein the variable stiffness material comprises sections connecting adjacent connectors.

4. The variable stiffness joint of claim 3, wherein the connectors comprise sides, and wherein the sections are interposed between the sides of adjacent connectors.

5. The variable stiffness joint of claim 4, wherein the sections are sandwiched between the sides of the adjacent connectors.

6. The variable stiffness joint of claim 3, wherein the variable stiffness material is associated with a connecting linkage between the connectors and is configured to be capable of restraining a movement of the connectors.

7. The variable stiffness joint of claim 6, wherein the variable stiffness material further comprises an activator and is capable of exerting a force when the activator is controlled.

8. The variable stiffness joint of claim 3, wherein the plurality of structural members each comprise the connector at an end of each of the plurality of structural members.

9. The variable stiffness joint of claim 1, wherein the variable stiffness material comprises three generally orthogonal intersecting sections, and wherein each of the plurality of structural members comprises a connector comprising faces abutting three adjacent portions of the generally orthogonal intersecting sections.

10. The variable stiffness joint of claim 1, wherein the variable stiffness material comprises a shape memory polymer.

11. The variable stiffness joint of claim 1, wherein the variable stiffness material comprises a shape memory alloy.

12. The variable stiffness joint of claim 1 further comprising a control system associated with the variable stiffness material adapted to control a stiffness of the variable stiffness material.

13. The variable stiffness joint of claim 12, wherein the variable stiffness material comprises a section located between each of the plurality of structural members, and wherein the control system is configured to allow individual control of the sections.

14. A variable stiffness joint comprising:
   a) a spherical joint comprising:
      (1) a plurality of structural members; and
      (2) variable stiffness material associated with each of the plurality of structural members and configured to allow controllable restraint of the plurality of structural members so as to be capable of controlling non-tensile movement of the plurality of structural members.

15. The variable stiffness joint of claim 14 further comprising a means for selectively controlling the variable stiffness material.

16. The variable stiffness joint of claim 15, wherein the variable stiffness material and the means for selectively controlling the variable stiffness material are constructed to allow controllable fixation and release of the plurality of structural members.

17. The variable stiffness joint of claim 15, wherein the variable stiffness material comprises sections located between each of the plurality of structural members, and wherein the means for selectively controlling further comprises a means for individually controlling the sections.

18. The variable stiffness joint of claim 14, wherein the variable stiffness material comprises sections connecting adjacent structural members.

19. The variable stiffness joint of claim 18, wherein the variable stiffness material is laminated between adjacent structural members.

20. The variable stiffness joint of claim 14, wherein the variable stiffness material is interposed between at least some of the plurality of structural members.

21. The variable stiffness joint of claim 14, wherein the plurality of structural members are mechanically connected together and wherein the variable stiffness material is located about each of the plurality of structural members to be capable of restraining a movement of at least some of the plurality of structural members.

22. The variable stiffness joint of claim 21, wherein the variable stiffness material further comprises an activator and is capable of exerting a force when the activator is controlled.

23. The variable stiffness joint of claim 14, wherein the variable stiffness material comprises a shape memory polymer.

24. The variable stiffness joint of claim 14, wherein the variable stiffness material comprises a shape memory alloy.

25. The variable stiffness joint of claim 14, wherein the variable stiffness joint is reconfigurable so as to allow load tailoring within an apparatus.

26. A variable stiffness joint comprising:
   a) a plurality of structural members;
   b) a variable stiffness material coupling the plurality of structural members, and c) wherein the variable stiffness material comprises three generally orthogonal intersecting sections, each of the plurality of structural members comprises a connector comprising faces abutting three adjacent portions of the generally orthogonal intersecting sections.

27. A variable stiffness joint comprising:
a) a plurality of structural members;
b) a variable stiffness material coupling the plurality of structural members so as to be capable of controlling non-tensile movement of the plurality of structural members, and
c) wherein at least one of the plurality of structural members is capable of at least one of: (1) at least three degrees of freedom of movement; or (2) one degree of rotational movement.

28. The variable stiffness joint of claim 27, wherein at least one of the plurality of structural members is capable of one degree of rotational movement.

29. The variable stiffness joint of claim 27, wherein at least one of the plurality of structural members is capable of at least three degrees of freedom of movement.

* * * * *